United States Patent [19]

Rabinowitz et al.

[11] Patent Number: 5,325,002
[45] Date of Patent: Jun. 28, 1994

[54] TRAPPED-FIELD, SUPERCONDUCTING, INDUCTION-SYNCHRONOUS MOTOR/GENERATOR HAVING IMPROVED STARTUP TORQUE

[75] Inventors: Mario Rabinowitz, Redwood, Calif.; James S. Edmonds, Bellevue, Wash.

[73] Assignee: Electric Power Research Institute, Palo Alto, Calif.

[21] Appl. No.: 837,824

[22] Filed: Feb. 18, 1992

[51] Int. Cl.$^5$ .................... H01B 12/00; H02K 55/00; H02K 7/09
[52] U.S. Cl. .................................... 505/166; 310/10; 310/52; 505/876
[58] Field of Search ................. 310/10, 52, 42; 505/1, 505/876

[56] References Cited

U.S. PATENT DOCUMENTS

| | | | |
|---|---|---|---|
| 3,432,699 | 3/1969 | Albinger, Jr. | 310/41 |
| 3,609,418 | 9/1971 | Halas | 310/10 |
| 3,904,898 | 9/1975 | Mailfert | 310/52 |
| 3,904,899 | 9/1975 | Malfert | 310/52 |
| 3,916,229 | 10/1975 | Litz et al. | 310/52 |
| 4,034,245 | 7/1977 | Mailfert et al. | 310/52 |
| 4,037,123 | 7/1977 | Mole et al. | 310/52 |
| 4,058,746 | 11/1977 | Mole et al. | 310/10 |
| 4,176,291 | 11/1979 | Rabinowitz | 310/52 |
| 4,577,126 | 3/1986 | Mailfert | 310/52 |
| 4,814,677 | 3/1989 | Plunkett | 318/254 |
| 4,830,412 | 5/1989 | Raad et al. | 290/31 |
| 4,885,494 | 12/1989 | Hagashi | 310/52 |
| 4,987,674 | 1/1991 | Denk | 29/596 |
| 5,057,726 | 10/1991 | Mole et al. | 310/67 R |
| 5,177,054 | 1/1993 | Lloyd et al. | 310/10 |

OTHER PUBLICATIONS

Rabinowitz, et al, *Dependence of maximum trappable field* ... Jun. 1, 1977, pp. 607–609.
Rabinowitz, et al, *An Investigation of the Very Incomplete* ... May 5, 1973.
Rabinowitz, *Multipole Magnetic Field Trapping By Superconductors* Mar. 2, 1975, pp. 548–550.
Garwin, et al, *Permanent multipole magnetic fields stored* ... Jun. 1, 1973, pp. 599–600.

Primary Examiner—Steven L. Stephan
Assistant Examiner—Clayton LaBelle
Attorney, Agent, or Firm—John A. Frazzini

[57] ABSTRACT

A motor/generator that is operable in an inductive mode during a startup phase and in a synchronous mode thereafter. Superconductor material is included in either the stator or the rotator and a magnetic field generator is included in the other of these two members. Induced fields in a torque-shield provide coupling between the stator and the rotor during the startup phase and then a trapped field in the superconductor provides coupling between the stator and the rotor thereafter.

26 Claims, 2 Drawing Sheets

TRAPPED-FIELD, SUPERCONDUCTING, INDUCTION-SYNCHRONOUS MOTOR/GENERATOR HAVING IMPROVED STARTUP TORQUE

FIELD OF THE INVENTION

This invention relates in general to motors and generators and relates more particularly to a motor having improved startup torque.

BACKGROUND OF THE INVENTION

In general, motors and generators are substantially equivalent and differ primarily in regard to whether electrical power is applied to produce mechanical power or mechanical power is applied to produce electrical power. Because of this, the word "motor/generator" herein means both motors and generators. In both cases, the motor/generator includes a typically nonrotating component, referred to as the "stator", and a rotating component, referred to as the "rotor".

Two broad classes of motor/generators are induction motor/generators and synchronous motor/generators. An "induction motor/generator" is an asynchronous, alternating current (ac) motor/generator in which an alternating current is applied to a set of primary windings in a first member (usually, the stator) to produce a magnetic field that induces an alternating current in a set of secondary windings in a second member (usually, the rotor). Typically, the secondary windings carry only current induced by the magnetic field produced by the primary windings.

In many embodiments, the primary windings produce a magnetic field that rotates around an axis of the rotor. In such embodiments, the interaction of the magnetic field from the primary windings with the resultant induced magnetic field from the secondary windings produces a more uniform torque of the rotor about its axis. The rotational speed of this motor/generator is determined by the frequency of the power supplied by the ac current, by the configuration of the primary winding, and by the load that is rotated by this motor/generator.

"Rotating and Stationary Electrical Circuits" are the two principal circuits in an induction motor. In conventional induction motors, one winding of the two electric circuits rotates with respect to a fixed winding, and power is transferred from one circuit to the other by electromagnetic induction. Conventionally, a primary winding in one electrical circuit member (usually the stator) is connected to the power source and a secondary electrical circuit (usually the rotor) carries only current induced by the magnetic field of the primary electrical circuit during acceleration of the rotor. When the rotating electrical circuit is in synchronism with the rotating magnetic field in the air gap of the motor, the current in the rotating electrical circuit is zero.

A "synchronous motor/generator" is an ac motor/generator in which an ac current in a first member (either the rotor or the stator) produces a temporally periodic magnetic field that interacts with a temporally constant magnetic field produced by a second member (either the stator or the rotor). This constant magnetic field can be produced by permanent magnets mounted in the second member or by a dc current supplied to windings in this second member. This constant magnetic field can be produced by one or more permanent magnets mounted on the second member and/or by a dc current supplied to one or more windings, in the second member, that are connected to a dc electrical power source. The temporal period of the magnetic field from the first member should be some rational multiple of the period of rotation of the rotor.

An important parameter that characterizes a motor/generator is the maximum torque that can be produced by that motor/generator. This maximum torque is related to the product of the amplitudes of the magnetic fields produced by the stator and the rotor. It is therefore advantageous to make each of these fields as large as possible. In U.S. Pat. No. 4,176,291 entitled *Stored Field Superconducting Electrical Machine and Method* issued to Mario Rabinowitz on Nov. 27, 1979, the maximum torque of a synchronous motor/generator is increased by producing a particularly large dc magnetic field in the form of a magnetic field that is trapped in a superconducting cylinder.

Each cylindrical layer of superconductor is segmented to minimize hysteretic power loss. Segments in different layers are offset so that the gaps between segments in one layer do not overlie gaps in another layer, thereby reducing the effect of any fringing. A set of heaters enable the superconducting material to be placed in its nonsuperconducting state to allow the magnitude of stored field to be changed. While in this normal state, a set of field windings produce a magnetic field pattern that is trapped in this superconducting material when it is cooled sufficiently to become superconducting again. The pattern field can also be trapped in these superconducting layers by applying this pattern field with an intensity greater than the critical field $H_{C2}$ while these superconducting layers are in their superconducting state. The magnetic field pattern can even be trapped while the rotor is rotating, by timing pulses to the stator windings in a manner that produces a pattern field that rotates with the rotor. The division of the superconducting layers into segments does not significantly affect the magnetic pattern field that is stored by this process.

Because the average shaft angular velocity of a synchronous motor/generator is proportional to the frequency of the applied ac current, a synchronous motor/generator cannot be turned on simply by turning on the ac current that produces its temporally periodic magnetic field. Such a motor/generator can be started by providing a mechanical torque impulse appropriate to make the rotor rotate at a rational multiple of the ac current frequency. However, if this impulse is too large or too small, the necessary frequency is not achieved.

Unfortunately, in a trapped field motor/generator, as the rotor speeds up, until it rotates in synchronism with the rotating electromagnetic field in the stator, the driving torque is much less than if the field and rotor rotate in synchronism. The driving torque is a maximum when the field and rotor are in phase. The driving torque is a minimum when the rotor is at rest. Thus, although this motor/generator exhibits excellent maximum torque, it also exhibits poor startup torque.

In U.S. Pat. No. 3,432,699 entitled *Permanent Magnetic Synchronous Motor and Starting Mechanism Therefor*, issued to Harry Albinger, Jr. on Mar. 11, 1969, a conventional synchronous motor is presented that includes features which insure that an initial torque impulse provides the correct amount of rotational energy to ensure that the synchronous speed of rotation is achieved. This motor includes a conventional, permanent magnet rotor having a plurality of permanent magnetic poles around the periphery thereof. A pair of stator poles receive electric timing pulses that produce the periodic magnetic field needed to make the rotor rotate.

Synchronous motors often suffer from low startup torques that prevent them from quickly accelerating to a desired rotational speed. In U.S. Pat. No. 4,814,677 entitled *Field Orientation Control of a Permanent Magnet Motor* issued to Allan B. Plunkett on Mar. 21, 1989, a field orientation control system for an interior permanent magnetic synchronous motor is disclosed that provides improved performance at near zero rotational speeds. In contrast to the case of dc motors in which only the amplitude of the current is controlled to control torque or speed, in an ac motor both the amplitude and phase of this current, relative to the rotor angular position, can be used to control speed and torque. Position encoders are commonly included in ac synchronous motors so that the field produced by the ac current will be produced at the appropriate rotational orientation with respect to the permanent magnetic fields in this type of motor. This patent presents a controller that produces the optimal phase without using a rotor position sensor. A current is supplied initially to one of the field windings to ensure that the rotor is initially aligned with the field produced by that winding.

The problem of low initial torque of a synchronous motor is also addressed in U.S. Pat. No. 4,830,412 entitled *Starting System and Method Using a Hybrid Permanent Magnet/Induction Machine* issued to Bernard A. Raad et al on May 16, 1989. This patent presents a hybrid machine, for starting a prime mover. This hybrid machine includes a squirrel cage having bars that are interposed between a set of permanent magnets. When ac power is applied to armature windings, this hybrid machine operates as a synchronous motor. When the rotor of this hybrid machine approaches synchronous rotation speed, the relative rotational velocity of the rotor and rotating field produced by the armature approaches zero, the inductively generated torque on the rotor approaches zero so that the magnetic field of the permanent magnets dominates the coupling between the rotor and the ac magnetic field from the armature. This hybrid machine thereafter operates as a synchronous motor.

Raad also discusses the following references by Mehl et al and by Cronin. Mehl et al, U.S. Pat. No. 4,481,459 discloses a permanent magnet brushless generator. Once synchronous speed is reached, ac power at the synchronous frequency of the main generator is applied to the stator windings thereof to cause the main generator to operate as a synchronous motor.

Cronin U.S. Pat. No. 4,473,752 discloses a starter-generator machine which includes a rotor-shaped stator that is fixed within a squirrel cage induction rotor. The rotor has permanent magnets on its outer circumference. Once a given rotor speed is achieved, ac power is applied to the stator windings which surround the rotor. This synchronizes the rotating magnetic field of the permanent magnets with the rotating field developed by the stator to produce maximum motive power.

In U.S. Pat. No. 4,885,494 entitled *Motor and Motor Device* issued to Kazuhiko Higashi on Dec. 5, 1989, a superconducting motor is disclosed that is similar to the permanent magnet motors described above, in that it also operates as a hybrid induction-synchronous motor and has a squirrel cage rotor. It differs from the above patent by Raad in that it does not have any permanent magnets.

It would be advantageous to achieve the high maximum torque of the motor presented in the patent by Rabinowitz, the increased startup torque of the hybrid machines presented in the patents by Raad and Higashi without the complexity of the motor presented in Plunkett, et al.

SUMMARY OF THE INVENTION

In accordance with the illustrated preferred embodiments, a motor/generator is presented that exhibits a high maximum torque, improved startup torque and design simplicity. This motor/generator can operate in either synchronous or induction modes and, unlike the hybrid motor/generator presented in the patent by Raad that was discussed above, in each of these modes it operates purely as an induction motor/generator or purely as a synchronous motor/generator. Therefore, there is no interference between these aspects of the motor/generator by implementing both aspects concurrently as in Raad. This new motor/generator automatically switches from an induction mode utilized during startup to a synchronous mode once the motor/generator speed has substantially reached the desired speed of synchronous mode operation.

This motor/generator includes a stator and a rotor. A first of these two members contains superconducting material and a second of these two members contains a magnetic field generator that produces a magnetic field that rotates relative to that member about a rotational axis of the rotor. This magnetic field generator can take the form of a plurality of windings that are supplied with currents of appropriate relative phase and amplitude to produce the desired rotating magnetic field. Preferably, this magnetic field can apply to the rotor a constant torque of selectable amplitude.

Attached to the first member and positioned between the magnetic field generator and the superconducting material is a sheet of electrically conductive material, referred to herein as the "torque-shield". During a startup phase of operation, the magnetic field induces in this torque-shield currents that product a torque on the rotor, whereby this motor/generator operates in its induction mode.

The thickness of the torque-shield is selected such that the magnetic field produced by the magnetic field generator does not significantly penetrate into the superconducting material during this inductive mode of operation. However, when this motor/generator substantially reaches the desired rotational speed, this magnetic field is extended into the superconducting material and is then trapped in this superconducting material, thereby producing a trapped field that enables this motor/generator to operate in its synchronous mode of operation.

The thickness and distributed electrical characteristics of the torque-shield are tailored to perform two functions that are quite distinct from the prior art: (i) produce a large bucking magnetic flux (until synchronism is achieved) to the impinging magnetic flux, thereby protecting the superconductor and minimizing power loss in the superconductor; and (ii) producing a counter magnetic field that interacts with the rotating magnetic field to produce substantial torque. As will be next discussed in terms of skin depth and thickness of the torque-shield, the incident magnetic field is excluded, thus guarding the superconductor and at the same time producing mechanical torque on the motor shaft to cause it to accelerate a mechanical load connected to the shaft.

The required thickness for the torque-shield is dependent on the skin depth for the electromagnetic fields incident on this torque shield. "Skin depth" is the distance below the surface of a conductor carrying alternating current, where the current density drops to $1/e = 1/2.718 = 0.368$ of its value at the surface. At a thickness of two skin depths, the current density drops to $(1/e)^2 = 0.135$. Thus, 1-2 skin depths is effectively the distance an impinging alternating magnetic flux is able to penetrate into the surface of a conducting material before it is appreciably attenuated. The skin depth is determined by the opposing magnetic flux set up by the induced circulating currents within the conducting material. Among other variables, the depth of magnetic flux penetration is a function of the frequency of that alternating flux. As the frequency is reduced to zero, the distance of penetration increases until at zero frequency (dc), the conducting material is magnetically transparent and the magnetic flux passes through the conducting material without attenuation. In general, the magnetic field B is equal to $B_0 e^{-x/\delta}$, where $B_0$ is the magnetic field at the surface of the conductor and x is the distance in from the surface. The skin depth $\delta$ is equal to $[\pi f \mu \sigma]^{\frac{1}{2}}$ where f is the frequency in Hz, $\mu$ is the permeability in Henries/m, and $\sigma$ is the conductivity in mhos/m. For example, for copper (for which $\sigma = 5.82 \times 10^7$ mhos/m and $\mu = 12.57 \times 10^{-7}$ h/m) at a frequency f of 60 Hz, the skin depth is 0.85 cm, which is about one-third of an inch.

There are two different methods of trapping the magnetic field in the superconducting material. In the first method, the superconducting material is maintained at a temperature above its superconducting transition temperature and, at the time it is desired to trap the magnetic field in this superconducting material, its temperature is lowered below its superconducting transition temperature. In the second method, the superconducting material is below its superconducting transition temperature prior to reaching substantially the desired rotational speed. When this speed is reached, the magnetic field generator produces a pulsed magnetic field that is strong enough to exceed in the superconducting material the critical field of this material. For type II superconductors, the magnetic field is made to exceed the second critical field, $H_{C2}$, of this superconducting material.

In accordance with both of these methods, in the superconducting material is produced a trapped field that functions in the same manner as permanent magnets in conventional synchronous motor/generators. A first embodiment is presented in which this magnetic field is substantially axial (relative to the rotational axis of this motor/generator) and a second embodiment is presented in which this magnetic field is substantially radial. Because this motor/generator has only a primary set of windings, it is simpler in some ways than most motor/generators. The embodiment in which the superconducting material is in the rotor is advantageous because it does not require a slip ring electrical connection for the rotor.

The superconducting material can be in any of a variety of forms, including particulate, foil, bulk and thin film superconducting materials. Because it is in a non-wire form, instead of one or more windings of wire, the motor/generator can be implemented with substantially any superconducting material, including those that are too brittle to be easily and/or cost-effectively formed as superconducting wires. The superconducting material can be segmented by a series of gaps to reduce hysteretic losses. The trapped field is not significantly affected by such gaps.

The trapped field can have any even polarity (e.g. dipole, quadrupole, sextupole, octupole, etc.). Although it is preferred that each local pole does not significantly overlap any of the segmenting gaps, such overlapping of gaps does not significantly affect operation. Consistent with the view that the trapped field is produced by magnetic vortices in the superconductor, these gaps will affect such pole only by reducing the amplitude of that pole by a fractional amount equal to the factional area of such pole that overlaps these gaps.

These and other advantages of the present invention will become clear from the detailed description given below in which a preferred embodiment is described in relation to the drawings. The detailed description is presented to illustrate the present invention, but is not intended to limit it.

CONVENTION REGARDING REFERENCE NUMERALS

Figure 1:
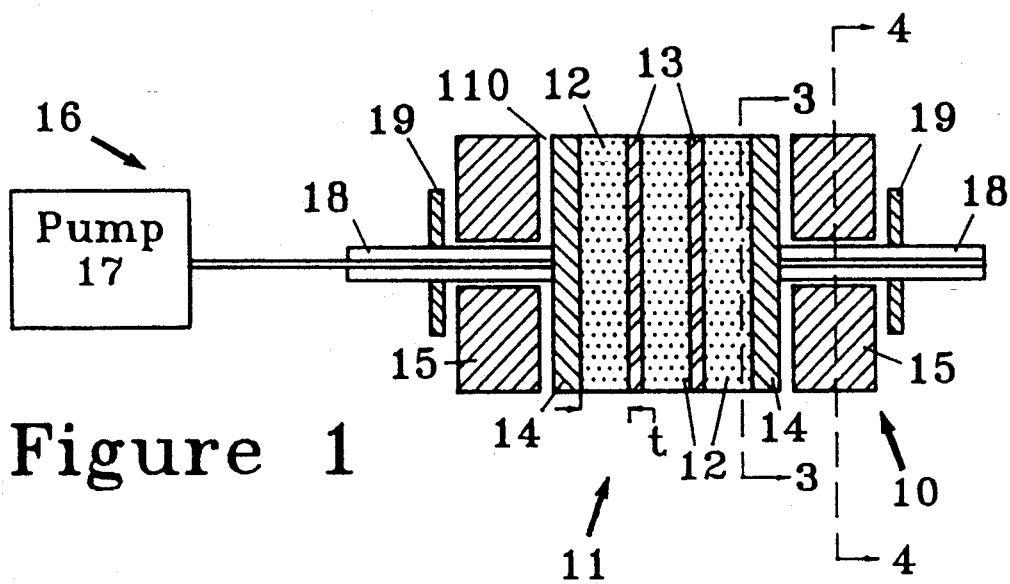
FIG. 1 is a longitudinal cross-sectional view of an axial gap, trapped field motor/generator in which the superconducting material is in the rotor.

In the figures, the first digit of a reference numeral indicates the first figure in which is presented the element indicated by that reference numeral.

DESCRIPTION OF THE PREFERRED EMBODIMENT

Figure 2:
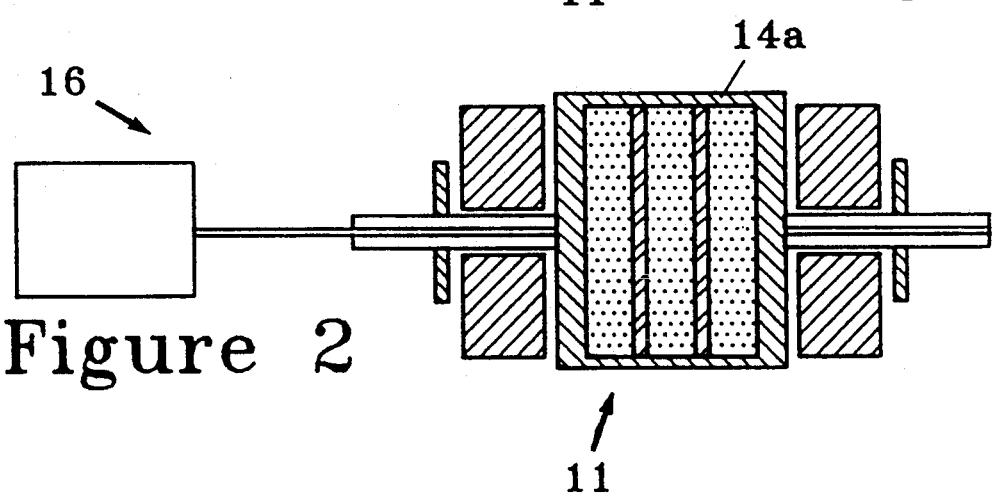
FIG. 2 is a longitudinal cross-sectional view of an axial gap trapped field motor/generator with an extended torque-shield.
Figure 3:
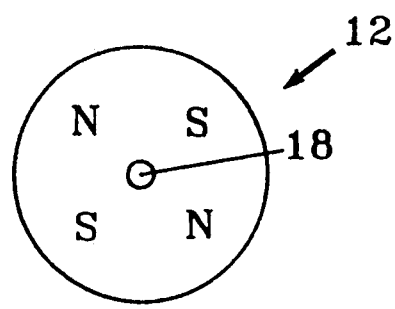
FIG. 3 is a transverse cross-sectional view of the rotor of FIG. 1.
Figure 5:
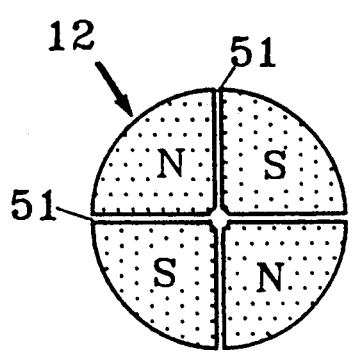
FIG. 5 is a transverse cross-sectional view of an alternate embodiment of the rotor of FIG. 1 in which the superconducting material is segmented by a plurality of gaps.

In FIGS. 1 and 2 is illustrated a motor/generator that can be controllably operated in induction and synchronous modes to provide improved startup torque while retaining the advantages of synchronous motor/generator operation. FIG. 1 is a longitudinal cross-sectional view of an axial gap, trapped field motor/generator in which the superconducting material is in the rotor. FIGS. 3 and 5 are each a transverse cross-sectional view of the rotor of FIG. 1.

In this embodiment, a rotor 11 contains a plurality of alternating layers 12 of superconducting material, electrical-thermal conductors 13, such as copper or aluminum. Although rotor 11 can contain as little as a single layer of superconducing material, in order to increase the amount of superconducting material in the rotor, it is preferred to have several layers 12. Superconductors are typically very poor thermal conductors because, thermal energy within them is transported primarily by phonons, instead of by electrons as in the case in most good thermal conductors. Therefore, layers of superconducting material thicker than about 100 Å are interleaved with layers of good thermal conducting material to carry off heat sufficiently rapidly that the temperature of layers 13 of superconducting material can be switched between being above the critical temperature and below the critical temperature in commercially convenient intervals.

Electrical-thermal conductors 13 also provide an ameliorative function that protects the superconductor material from damage in the eventuality that small portions of the superconductor were to transition into the nonsuperconducting state during a period in which it is carrying such a high current density that undesired quench of the superconductor would then result. Such transition could occur because the temperature of the superconducting material rises above its superconducting transition temperature. Quench could also occur if the critical current density is exceeded in the superconductor. The superconducting material will be damaged if the resistive losses in the superconductor produce enough heat to damage the superconducting material. This particular embodiment of the rotor includes three layers of superconducting material and two electrical-thermal conductors 13.

TABLE 1 lists some exceptional (in terms of the combination of high $T_C$ and high $H_{C2}$) metallic superconducting materials as well as each material's transition temperature $T_c$ and second critical field $H_{c2}$ at 4.2° K. $H_{c2}$ generally decreases as the temperature increases.

TABLE 1

| EXCEPTIONAL METALLIC SUPERCONDUCTORS | | |
|---|---|---|
| Superconductor | $T_c$, K | $H_{c2}$ (at 4.2K) kOe |
| Nb$_3$Al | 18.9 | 300 |
| Nb$_3$Ga | 20.3 | 330 |
| Nb$_3$Ge | 23.2 | 370 |
| Nb$_3$(Al,Ge) | 21 | 410 |
| Nb$_3$Sn | 18.1 | 220 |
| Nb$_x$Ti$_y$ | 9.5 | 120 |
| Nb$_x$Zr$_y$ | 11.5 | 70–80 |
| V$_3$Ga | 15–16.8 | 230 |
| PbMo$_{5.1}$S$_6$ | 14.6 | 500 |
| V$_2$(Hf,Zr) | 10 | 240 |
| (V,Nb)$_2$Hf | 10 | 260 |

(x and y are variable percentages)

TABLE 2 lists some high temperature superconductors that can also be used in this motor/generator.

TABLE 2

| HIGH TEMPERATURE SUPERCONDUCTORS | |
|---|---|
| Superconductor | $T_c$, K |
| Ba$_{0.6}$K$_{0.4}$BiO$_3$ | 30 |
| La$_{2-x}$Ba$_x$CuO$_{4-y}$ | 35 |
| Y$_1$Ba$_2$Cu$_3$O$_{7-y}$ | >94 |
| Bi$_5$Sr$_{3-x}$Ca$_x$Cu$_2$O$_{8+y}$ | >110 |
| Tl$_2$Ba$_2$CaCu$_2$O$_8$ | >120 |
| Cs$_3$C$_{60}$ | 33 |

TABLE 2-continued

| HIGH TEMPERATURE SUPERCONDUCTORS | |
|---|---|
| Superconductor | $T_c$, K |
| RbTl$_x$C$_{60}$ | 45 |

(x and y are variable percentages)

The last two compounds in TABLE 2 are alkali metal doped Buckminsterfullerene (C$_{60}$) based solids, also known as Buckyballs.

The high transition temperature ($T_C$) superconductors (i.e., materials, that have a $T_C$ greater than 29° C) are preferable, because the use of such superconductors reduces the cost and complexity associated with meeting the cooling requirements of low $T_C$ superconductors. The high $T_C$ ceramic oxides are particularly attractive choices, because they all have very high second critical fields $H_{C2}$. In thin film form, they have high critical current densities that exceed $10^6$ A/cm$^2$. The metallic superconductors have critical current densities as high as $10^7$ A/cm$^2$.

The ends of the superconductor are covered with a good electrically conducting torque-shield 14 of material such as copper, aluminum, or beryllium, which serves to inductively couple the rotor to the applied ac travelling wave electromagnetic field produced in a set of stator windings 15. It is this inductive coupling between the travelling wave electromagnetic field produced by stator windings 15 and rotor 11 that enables this motor/generator to function in an induction mode during a startup phase of operation in which this rotor is accelerated up to operating speed.

These torque-shields also serve the purpose of shielding the superconducting material from the travelling electromagnetic field. This is done to avoid unwanted heat dissipation within the superconducting material. Such heat dissipation can occur not only when the superconducting material is in its nonsuperconducting state, it can also occur when it is in the superconducting state because these are alternating currents which cause power loss in the superconductor, and not direct current for which superconductors have zero resistance. The name "torque-shield" has been utilized for element 14 to convey this double purpose for this element.

The thickness of torque-shields 14 can be tailored with respect to their skin depth $\delta$ such that the electromagnetic fields generated by stator windings 15 will not penetrate them until the relative frequency (i.e., the "slip") between the travelling wave and the rotating rotor is less than some prescribed value, such as less than 5 Ha, as related to the maximum tolerable ac loss in the superconductor. This value determines the point at which the mode of operation converts from the startup phase induction mode to an operating phase in which it functions in the synchronous mode. The ability to control when the magnetic field gets trapped in the superconducting material enables control over the choice of when this motor/generator converts between induction and synchronous modes. A thickness on the order of one inch should be adequate for most torque-shields.

The travelling wave electromagnetic field produced by stator windings 15 can be trapped in the superconductor by either of the following two methods.

Trapping Method 1: The Rotor is at a Temperature T Below the Transition Temperature $T_C$ During the startup phase, rotor 11 is maintained at a temperature T below the critical temperature $T_c$. Alternating current is applied to stator windings 15 to initiate the startup phase. When the slip decreases to the preselected value, the magnetic field produced by windings in the stator 10 is briefly increased temporarily (in less then a second) to produce a magnetic field that exceeds the second critical field $H_{c2}$ for the operating temperature T of the rotor at that time. This enables the travelling electromagnetic field to penetrate into the superconductor.

This increased field can be produced by temporally increasing the magnitude of the magnetic field produced by the stator windings 15 or can be produced by a separate set of windings. For reasons of simplicity, it is preferred to produce this increased field by means of pulsing the stator windings 15. This not only avoids the complexity of an extra set of windings, it also enables this increased magnetic field to be achieved in a magnetic field that is rotating at nearly the same rotation rate as the rotor. Thus, such increased field has substantially no slip, so that the resulting magnetic field experienced by the rotor is nearly constant in time. This enables the resulting trapped magnetic field to avoid any smearing that would result if the magnetic field producing the trapped field in the superconductor were not substantially temporally constant during this period of increased field.

After the pulsed (transient) magnetic field is switched off, a substantial portion of the travelling electromagnetic field is trapped in the superconductor 12. Properties of the superconductor, such as flux pinning which enable trapping of the magnetic field are described in U.S. Pat. No. 4,176,291. The superconductor 12 is maintained at a temperature T below the transition temperature $T_c$ by the cooling means 16. In this embodiment, cooling apparatus 16 consists of a pump 17, a hollow rotor shaft 18 and electrical-thermal conductors 13. At that time at which the slip is less than the preselected value, pump 17 introduces a cryogen (coolant) through hollow rotor shaft 18. In the future, room temperature superconductors may be developed, in which case it may be possible to eliminate the cooling structures of the present preferred embodiments.

TABLE 3 lists come coolants that can be used in cooling apparatus 16.

TABLE 3

| Coolant | CRYOGENIC COOLANTS | |
|---|---|---|
| | Chemical Symbol | Boiling Point, °C. (1 atm.) |
| Liquid Ammonia | $NH_3$ | −33.3 |
| Liquid Radon | Ra | −61.8 |
| Dry Ice | $CO_2$ | −78.5 (sublimates) |
| Liquid Xenon | Xe | −107.1 |
| Liquid Krypton | Kr | −152.9 |
| Liquid Oxygen | $O_2$ | −183.0 |
| Liquid Argon | A | −185.7 |
| Liquid Nitrogen | $N_2$ | −195.8 |
| Liquid Neon | Ne | −245.9 |
| Liquid Hydrogen | $H_2$ | −252.8 |
| Liquid Helium | He | −268.9 |

(°K. = °C. + 273.2)

Hollow rotor shaft 18 can be supported by a pair of nearly frictionless superconducting bearings 19. A gap 110 separates the rotor 11 from the stator 10.

Trapping Method 2: The Rotor is Initially Above The Transition Temperature

As the slip approaches zero, (i.e. as the rotational frequency approaches the travelling wave frequency), the applied magnetic field begins to penetrate significantly through shields 14 into superconducting material 12 that is in the normal state. Coolant from cooling apparatus 16 is then introduced into labyrinth paths in the superconductor bringing it below $T_c$ into the superconducting state. As described in previously published papers by Mario Rabinowitz and his colleagues (see, for example, Mario Rabinowitz, H. W. Arrowsmith, and S. D. Dahlgren, *Dependence of maximum trappable field on superconducting $Ng_2Sn$ cylinder wall thickness*, Applied Physics Letters 30, 607 (1977); Mario Rabinowitz, *Multipole Magnetic Field Trapping By Superconductors*, IEEE Trans. On Magnetics, MAG 11, 548 (1975); M. Rabinowitz, E. L. Garwin and D. J. Frankel, *An Investigation of the Very Incomplete Meissner Effect*, Nuovo Cimento Letters, vol. 7, no. 1 (1973); and E. L. Garwin, M. Rabinowitz and D. J. Frankel, *Permanent multipole magnetic fields stored in superconductors*, Appl. Phys. Letters 22, 599 (1973) by E. L. Garwin, M. Rabinowitz, and D. J. Frankel, a large portion of the applied magnetic field will now be trapped in the superconductor. In the Applied Physics Letters, 30 article, Rabinowitz and his colleagues trapped 22,400 Oe, the largest trapped field yet reported. The magnitude of the trapped field can be varied by varying the magnitude of the applied magnetic field at the time that such field is trapped in the rotor.

FIG. 2 illustrates an alternate embodiment in which the torque-shield 14 includes a cylindrical portion 14a that extends over the remainder of superconducting material 12. Such extension prevents stray electromagnetic fields from penetrating through the cylindrical sides of the superconducting material and possibly interfering with the production of the desired trapped fields in the superconducting material.

Figure 4:
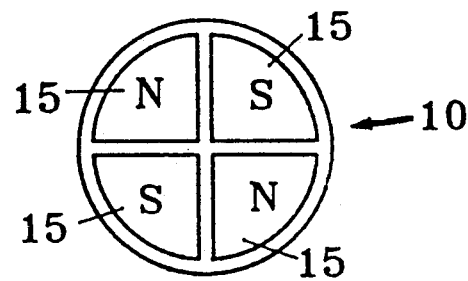
FIG. 4 is a transverse cross-sectional view of the stator of FIG. 1, illustrating the pattern of its stator windings.

FIG. 3 is a transverse cross-sectional view of the rotor of FIG. 1. In this embodiment, four magnetic poles, of alternating North and South poles, are produced by the field trapping process discussed above. This quadrupole structure is produced by a set of four stator windings 15, of alternating North/South polarity, in a stator 10 (illustrated in FIG. 4).

FIG. 5 is a transverse cross-sectional view of an alternate embodiment of the rotor of FIG. 1 in which the superconducting material is segmented by a plurality of gaps 51. These gaps reduce the amount of hysteretic current and eddy current losses in the rotor, but do not significantly impact the production of the trapped fields in this rotor. If one of these trapped field regions overlaps such a gap, it will be weakened by the fraction of its area that overlaps such gaps, but will not be otherwise impacted, because this trapped field is composed of tiny vortex regions.

Figure 6:
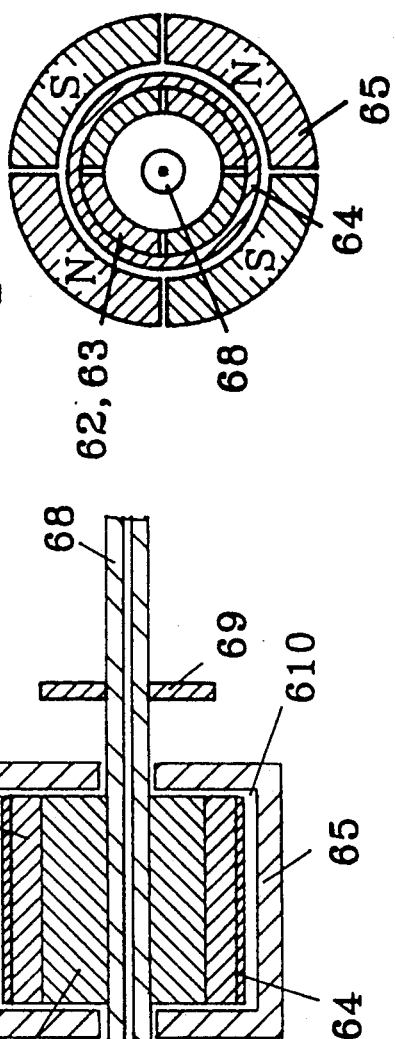
FIG. 6 is a longitudinal cross-sectional view of a radial gap trapped field motor/generator.
Figure 7:
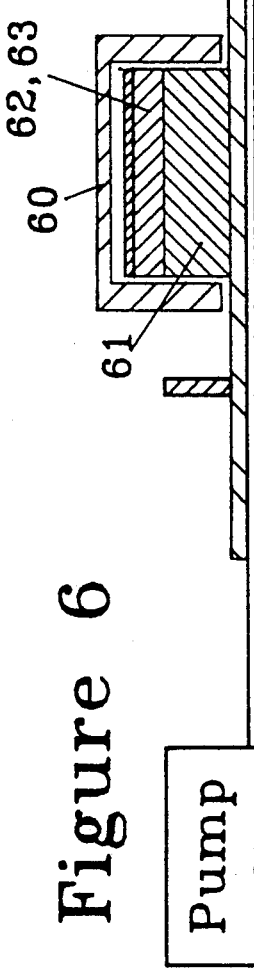
FIG. 7 is a transverse cross-sectional view of a radial gap trapped field motor/generator.

FIGS. 6 and 7 are a longitudinal and transverse cross-sectional views, respectively, of a radial gap trapped field motor/generator, having a stator 60 and a rotor 61. This embodiment has a similar longitudinal cross-sectional view as illustrated in FIG. 1 or in FIG. 2 for the axial gap, trapped field motor/generator. The layers of superconducting material 62 and electrical-thermal conductors 63 are shown segmented, although, as in the axial embodiments of FIGS. 1-5, it is not necessary that this layer be segmented. Surrounding the superconducting material 62 and electrical-thermal conductors 63, is a torque-shield 64 made of a good normal electrical conductor which operates in the same way as described for the torque-shield of FIG. 1. A gap 610 separates the rotor 61 from the stator 65, the rotor being supported by a hollow shaft 68. Alternating current in two or more phases (usually three phase ac) is supplied to the windings of the stator windings 65 to produce an applied ac travelling wave electromagnetic field that rotates about shaft 68. A pump 67 provides coolant through the hollow shaft 68, which is supported by a superconducting bearing 69. As in the axial field embodiments of FIGS. 3 and 5, this rotor has a quadrupole pattern of stator windings 65 and magnetic poles formed as trapped fields in the rotor. However, any multipolar pattern having an even number of alternating polarity, polar regions can be formed in the rotor.

Figure 8:
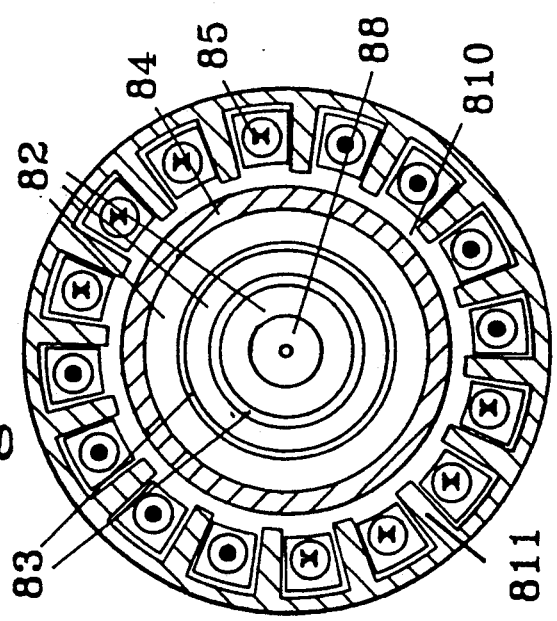
FIG. 8 is a transverse cross-sectional view of an alternate (preferred) embodiment of a radial gap trapped field motor/generator.

FIG. 8 is a transverse cross-sectional view of an alternate (preferred) embodiment of a radial gap trapped field motor/generator. Stator windings 85 are wound around a cylinder of slotted teeth 811 made of a ferromagnetic material, such as iron or steel, to enhance the magnetic field of the stator winding 85, to guide the windings of these stator windings and to hold the windings. The direction of current flow in these windings is indicated by the small circles with either a dot (indicating that this current is in the direction out of the paper) or a cross (indicating that this current is in the direction into the paper) in their centers. The other corresponding parts (layer of superconducting material 82, electrical-thermal conductors 83, torque-shield 84, hollow shaft 88 and gap 810) have analogous functions to the other embodiments.

Figure 9:
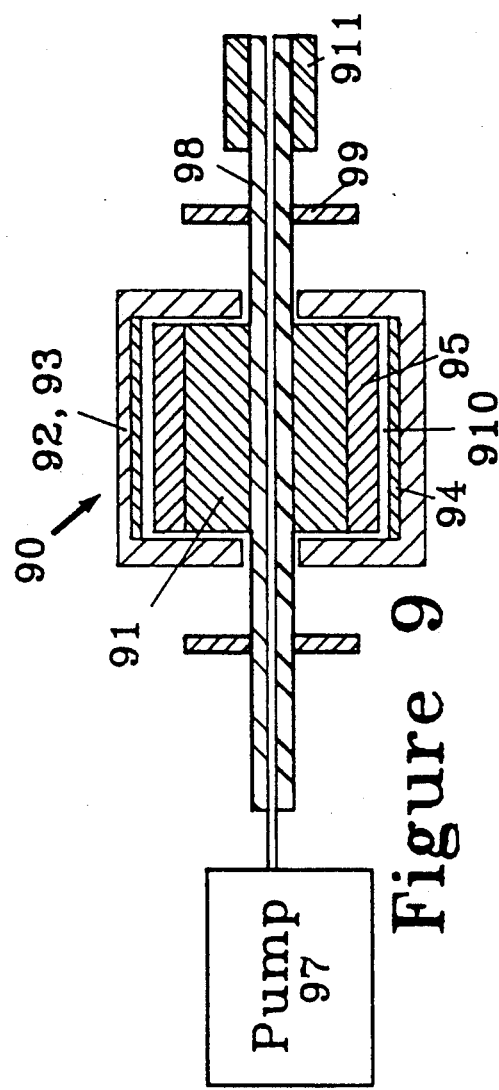
FIG. 9 illustrates an embodiment in which the superconducting material is contained in the stator and in which the magnetic field generator is contained in the rotor.

FIG. 9 illustrates a radial gap embodiment in which the superconducting material is in the stator. The following parts in this embodiment perform the same functions as their corresponding parts in the other embodiments: rotor 91, layers of superconducting material 92, electrical-thermal conductor 93, torque-shield 94, rotor windings 95, pump 97, hollow shaft 98, superconducting bearing 99 and gap 910. However, in this embodiment, a slip ring electrical connection 911 is included on the rotating shaft to supply the ac current to the windings in the rotor.

The foregoing detailed description is illustrative of the invention and it is to be understood that additional embodiments thereof will be obvious to those skilled in the art. This description, together with those additional embodiments obvious to those skilled in the art, are considered to be within the scope of the invention.

We claim:

1. A method of transmitting power between a stator and a rotor, said method comprising the steps of:
    (a) by means of a magnetic field generator attached to a first one of said stator and rotor, producing a temporally varying magnetic field that extends into a continuous sheet of electrically conductive, nonferromagnetic material, referred to herein as a torque shield, which is attached to a second one of said stator and rotor, this temporally varying magnetic field inducing in said torque-shield, during a startup phase of operation, currents that produce a torque of said rotor about a rotation axis of the rotor, whereby this motor operates in an induction motor mode; and then, when a slip between the rotating component of the magnetic field and the second of said stator and rotor falls below a preselected threshold achieved by a choice of thickness, conductivity and permeability of said torque-shield to achieve such threshold
    (b) trapping in a superconducting material within said rotor, a magnetic pattern field that rotates about the rotation axis at a rotational speed equal to a rotational speed of the rotor and that interacts with the temporally varying magnetic field from the magnetic field generator to produce a torque of the rotor about said rotation axis, whereby this motor operates in a synchronous motor mode.

2. A method as in claim 1 wherein, in step (a), the magnetic field produced by the magnetic field generator has at least one region of peak amplitude and this at least one region of peak amplitude rotates about said rotation axis at an angular frequency $\omega$.

3. A method as in claim 2 wherein step (b) is initiated when an amount of slip between the rotating magnetic field and the rotor is less than a preselected value.

4. A method as in claim 3 wherein said electrically conductive element functions as a torque-shield having a thickness and skin depth such that the amplitude of the magnetic field within the superconductor is less than the second critical field $H_{C2}$ of this superconductor until the amount of slip is less than said preselected value.

5. A method as in claim 1 wherein said magnetic field rotates as a rigid field.

6. A method as in claim 1 wherein step (b) comprises the steps of:
    (b1) holding the temperature of the superconductor to be less than its critical temperature $T_C$; and
    (b2) pulsing the magnetic field to a value greater than $H_{C2}$.

7. A method as in claim 6 wherein step (b2) comprises the step of producing a current pulse in a primary winding that is utilized to produce said rotating magnetic field.

8. A method as in claim 6 wherein step (b2) comprises producing in an auxiliary winding a current pulse of amplitude sufficient to produce throughout the superconductor a magnetic field that exceeds the second critical magnetic field $H_{C2}$ of the superconductor.

9. A method as in claim 1 wherein step (b) comprises the step of:
    when the slip drops below a preselected value, reducing the temperature of the superconducting material below the critical temperature $T_C$ of that superconducting material.

10. A method as in claim 1 wherein the magnetic field within the superconducting material is substantially perpendicular to said rotation axis.

11. A method as in claim 1 wherein the magnetic field within the superconducting material is substantially parallel to said rotation axis.

12. A method as in claim 1 wherein the superconducting material is in the stator.

13. A method as in claim 1 wherein the superconducting material is in the rotor.

14. A motor-generator comprising:
    a stator;
    a rotor that is rotatably attached to the stator such that the rotor can rotate about an associated rotation axis;
    superconductor material is included in a first of said stator and rotor;
    a magnetic field generator, which is rigidly attached to a second of said stator and rotor, includes a set of primary windings that can produce in said superconductor material a magnetic field that rotates around the rotation axis of the rotor;

means for trapping in said superconductor magnetic field that penetrates into said superconductor; and between the magnetic field generator and the superconducting material, a continuous sheet of conductive, nonferromagnetic material that functions as a torque-shield having a skin depth and thickness selected such that, for a normal operating amplitude of the magnetic field, the amplitude of the magnetic field within the superconducting material is less than its second critical field $H_{C2}$ and does not significantly penetrate through this torque-shield into this superconducting material until a slip between said rotating magnetic field and the second of said stator and rotor drops below a preselected value, said torque-shield also having sufficient electrical conductance that it can produce a torque of the torque-shield sufficient to bring the rotor up to synchronous speed.

15. A motor/generator as in claim 14 wherein said magnetic field rotates about the rotation axis of the rotor.

16. A motor/generator as in claim 15 wherein said means for trapping is activated to trap field in the superconducting material when the slip is less than some preselected value.

17. A motor/generator as in claim 16 wherein the magnitude of the magnetic field in the superconductor is less than $H_{C2}$ until slip is less than said preselected value; and the thickness and skin depth of the torque-shield are such that the magnetic field that penetrates through the torque-shield is less than $H_{C2}$ until slip drops to a preselected value and then exceeds $H_{C2}$, whereby this motor/generator automatically transforms into a synchronous motor when slip drops below said preselected value.

18. A motor/generator as in claim 15 wherein the magnetic field produced by the magnetic field generator has the form of a rotating magnetic field of constant peak amplitude.

19. A motor/generator as in claim 14 further comprising:

a means for holding the temperature of the superconducting material below its critical temperature $T_C$; and a means for pulsing the magnetic field to exceed the second critical field $H_{C2}$ of the superconducting material.

20. A motor/generator as in claim 19 wherein said means for pulsing the magnetic field to exceed the second critical field comprises a means for applying a current pulse to at least one primary winding in the stator to produce in the superconducting material a total magnetic field that exceeds the second critical field $H_{C2}$ for the superconducting material.

21. A motor/generator as in claim 19 wherein said means for pulsing the magnetic field to exceed the second critical field comprises:

an auxiliary winding in the stator; and means for applying a current pulse to said auxiliary winding such that a total magnetic field from the primary windings and the auxiliary winding produces in the superconducting material a total field that exceeds the second critical field $H_{C2}$ for the superconducting material.

22. A motor/generator as in claim 14 wherein, when the slip drops below a preselected value, reducing the temperature of the superconducting material below the critical temperature $T_C$ of that superconducting material.

23. A motor/generator as in claim 14 wherein the magnetic field within the superconducting material is substantially perpendicular to said rotation axis.

24. A motor/generator as in claim 14 wherein the magnetic field within the superconducting material is substantially parallel to said rotation axis.

25. A motor/generator as in claim 14 wherein the superconducting material is in the stator.

26. A the motor/generator as in claim 14 wherein the superconducting material is in the rotor.

* * * * *